US007132771B2

(12) United States Patent
Kwon et al.

(10) Patent No.: US 7,132,771 B2
(45) Date of Patent: Nov. 7, 2006

(54) MOTOR FOR WASHING MACHINE

(75) Inventors: Ho Cheol Kwon, Changwon-shi (KR); Jae Kyum Kim, Kimhae-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/297,061

(22) PCT Filed: Apr. 2, 2002

(86) PCT No.: PCT/KR02/00578

§ 371 (c)(1),
(2), (4) Date: Dec. 2, 2002

(87) PCT Pub. No.: WO02/080339

PCT Pub. Date: Oct. 10, 2002

(65) Prior Publication Data

US 2003/0132675 A1 Jul. 17, 2003

(30) Foreign Application Priority Data

Apr. 2, 2001 (KR) ............................... 2001-17445
Apr. 30, 2001 (KR) ............................... 2001-23388

(51) Int. Cl.
*H02K 5/10* (2006.01)
*H02K 5/12* (2006.01)
(52) U.S. Cl. .......................................... 310/86; 310/88
(58) Field of Classification Search ................ 310/214, 310/85, 86, 156.16, 156.19, 156.18, 254, 310/261, 156.22, 156.28, 156.31, 88, 75 R; 68/159, 12.02, 12.16
See application file for complete search history.

(56) References Cited

U.S. PATENT DOCUMENTS

| 3,053,189 | A | * | 9/1962 | White ........................ 417/357 |
| 3,279,765 | A | * | 10/1966 | Sato et al. ................... 366/273 |
| 3,334,252 | A | | 8/1967 | Gayral |
| RE26,438 | E | * | 8/1968 | White ........................ 417/357 |
| 3,604,222 | A | * | 9/1971 | Wutherich et al. ............. 68/24 |
| 4,115,716 | A | * | 9/1978 | Ogasawala et al. ......... 310/153 |
| 4,910,861 | A | * | 3/1990 | Dohogne ..................... 29/598 |
| 5,233,248 | A | * | 8/1993 | Kawamura et al. .......... 310/88 |
| 5,698,917 | A | * | 12/1997 | Shultz ........................ 310/87 |
| 5,828,152 | A | * | 10/1998 | Takeda et al. ......... 310/156.19 |
| 5,907,206 | A | * | 5/1999 | Shiga et al. ........... 310/156.05 |

(Continued)

FOREIGN PATENT DOCUMENTS

CN 1274782 11/2000

(Continued)

OTHER PUBLICATIONS

Notification of the Second Office Action dated Aug. 12, 2005.

*Primary Examiner*—Darren Schuberg
*Assistant Examiner*—Erik Preston
(74) *Attorney, Agent, or Firm*—McKenna, Long & Aldridge LLP

(57) ABSTRACT

A motor for a drum type washing machine is disclosed, wherein noise is reduced. To this end, the drum type washing machine is provided with a washing motor having a stator fitted at a rear surface of a tub and having a plurality of slots on which a coil is wound; a rotor provided at an outer side of the stator with a permanent magnet and connected to a washing drum inside the tub by a driving shaft; and isolating means for isolating a gap between the stator and the rotor not to be communicated with the stator and the rotor.

50 Claims, 19 Drawing Sheets

U.S. PATENT DOCUMENTS

| | | | | |
|---|---|---|---|---|
| 6,093,984 | A * | 7/2000 | Shiga et al. | 310/26 |
| 6,148,647 | A * | 11/2000 | Kabeya et al. | 68/140 |
| 6,452,301 | B1 * | 9/2002 | Van Dine et al. | 310/156.12 |
| 6,474,114 | B1 * | 11/2002 | Ito et al. | 68/140 |
| 6,536,242 | B1 | 3/2003 | Boutiette | |
| 6,617,721 | B1 * | 9/2003 | Neal | 310/68 D |

FOREIGN PATENT DOCUMENTS

| | | | |
|---|---|---|---|
| EP | 0 722 210 A | | 7/1996 |
| JP | 61001247 | * | 1/1986 ........... 310/156.19 |
| JP | 06-9347 | | 2/1994 |
| JP | 06-054472 | | 2/1994 |
| JP | 07046781 | * | 2/1995 |
| JP | 07-067277 | | 3/1995 |
| JP | 07-067277 A | | 3/1995 |
| JP | 07-288944 | | 10/1995 |
| JP | 2000-325693 | | 11/2000 |
| JP | 2000-325693 A | | 11/2000 |
| JP | 2001-078376 | | 3/2001 |
| WO | WO 99/43068 | | 8/1999 |

* cited by examiner

MOTOR FOR WASHING MACHINE

BACKGROUND OF THE INVENTION

1. Field of the Invention

The present invention relates to a washing machine, and more particularly, to a brushless DC motor for driving a drum-type washing machine that reduces noise.

2. Discussion of the Related Art

Generally, drum-type washing machines and methods use a frictional force between the laundry and the water in the drum to clean laundry. A motor rotates the drum and when a wash cycle is in progress, the drum contains detergent, water and laundry. The aforementioned drum-type washing machine and method has the advantages of preventing the laundry from being damaged or tangled and also creates the effect of beating and rubbing the laundry. One example of such a drum-type washing machine with a DC motor is depicted in FIGS. 1 to 4.

FIG. 1 is a cross sectional view of a washing machine that illustrates the structure of a conventional drum-type washing machine, and FIG. 2 is an enlarged view of the cut-out "A" in FIG. 1. As shown in FIGS. 1 and 2, a tub 3 capable of storing water for washing is installed in the interior of an enclosure or cabinet 5, and is provided therein with a drum 9 for containing the laundry. The drum 9 is located in the rear portion of enclosure or cabinet 5 and is connected to a drum shaft 17 that transfers force from motor 20 to drive drum 9.

A slot 11 is mounted on a front and rear end of the drum shaft 17, and tub 3 is provided in the center of enclosure or cabinet 5 with a slot housing 15 for supporting the slot 11. A support bracket 16 is fixed to the rear wall of the tub 3, and a stator 30, which is a part of a DC motor, is fastened to the supporting bracket 16 by means of a plurality of bolts 19.

As shown in FIG. 3, the stator 30 includes a ring-shaped frame 31, and protrusions or slots 33, which have coils 33a wound around them. Protrusions or slots 33 extend radially from the outside of the frame 31. A coupling rib portion 32 is formed integrally with the frame 31, extends inwardly from the frame 31, and has a coupling hole 32a for fixing the stator 30 to the rear wall of the tub 3.

Besides the stator 30, the motor 20 includes a rotor 40 shown in FIG. 4. The rotor 40 is coupled to the rear end of the drum shaft 17 by means of a fixing bolt 18. The drum 9 is directly coupled to the rotor 40 and rotates with the rotor 40.

The enclosure or cabinet 5 has a door on its front side and is connected to gasket 2, which also connects to the tub 3. A hanging spring 4 for supporting the tub 3 in the proper position is provided between the inside of the upper surface of the enclosure or cabinet 5 and the upper side of the circumference of the tub 3. A damper 10 reduces friction and vibration generated from the tub 3 during the spin cycle. Damper 10 is located between the inside of the lower surface of the enclosure or cabinet 5 and the lower side of the circumference of the tub 3.

In a conventional DC drum-type washing machine constructed as described above, the rotor 40 is rotated by an electromagnetic force created by the power supplied to the stator 30 and a permanent magnet 41 attached to the inside of the rotor 40. The force transferred to the drum shaft 17 allows the drum 9 to rotate, thereby facilitating a washing motion.

However, the conventional DC drum-type washing machine produces unwanted noise due to air friction between the rotor 40 and the stator 30. Specifically, if the rotor 40 is rotated at a high speed, some air flows rapidly through clearance space 21 between the stator 30 and the rotor 40, while other air between the stator 30 and the protrusion or slot 33 remains stationary. Therefore, a pressure differential is created between the static and dynamic air, and the air between the protrusions or slots flows into the clearance space 21 and collides with the air rapidly flowing through the clearance space 21 to generate a loud, undesirable sound. If the frequency of the sound is the same as the natural frequency of the rotor 40 or the stator 30, resonance occurs and enhances the unwanted noise to an amplified level. In particular, as the laundry in drum 9 dries, the speed of the rotor 40 and attached drum 9 increases, thus increasing the speed of dynamic air flow and ultimately generating louder unwanted noise.

In addition, the polarity of each protrusions or slots 33 is changed at a very high speed when the motor is operational, thus, protrusion or slots 33 vibrate and can reach a frequency that further amplifies the noise.

SUMMARY OF THE INVENTION

Accordingly, the present invention is directed to a brushless motor for use in a drum-type washing machine that substantially obviates one or more of the problems due to limitations and disadvantages of the related art.

An object of the present invention is to provide a brushless motor, for use in a drum-type washing machine, capable of suppressing or preventing noise generated during the operation of the motor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, there is provided a method for preventing fluid communication between a stator and a rotor. In one embodiment a motor is provided for use in a washing machine, the motor comprising: a stator fixed to a rear surface of a tub, having a plurality of protrusions or slots wound with a coil; a rotor located about the stator together with a permanent magnet, and directly coupled to a washing drum installed inside the tub by a driving shaft; and an isolating means for isolating a clearance between the stator and the rotor such that the stator and the rotor do not contact each other, and to prevent fluid connection between static and dynamic air.

The isolating means may include a shield plate for shielding a space formed between the protrusions or slots.

Preferably, the shield plate is a unitary piece enclosing all surfaces of the protrusions or slots facing the permanent magnet to entirely close the space between the protrusions or slots. The shield plate may also be a plurality of individual pieces, each attached to the surface of the adjacent protrusions or slot and facing the permanent magnet to individually close each space between the protrusions or slots.

Preferably, the shield plate is made of non-magnetic material, preferably a non-adhesive film or an adhesive tape. The film or tape is made of heat-shrink resin material Preferably, the isolating means further includes an auxiliary shield plate for closing the space between the permanent magnets.

The auxiliary shield plate is a unitary piece entirely enclosing a surface of the permanent magnet facing the protrusion or slot to entirely close the space between the permanent magnets, or is a plurality of individual pieces attached to a surface of the adjacent permanent magnet facing the protrusion or slot to individually close the space between the permanent magnets.

In another embodiment, the isolating means may include a plug member for filling a space between the protrusions or slots, and the auxiliary shield plate may be made of non-magnetic material.

The plug member may be a unitary piece that fills the spaces between each protrusion or slot, and preferably includes a hub seated on an upper surface of a frame of the stator; a coupling rib formed at the hub corresponding to the coupling rib for fixing the stator to the tub; and a plurality of tips formed at the hub at a regular intervals or increments, each of which is inserted into the space between the protrusions or slots. The plug member may further include a plurality of reinforcing ribs formed at the hub for support.

The plug member may also be a plurality of individual pieces, each individually filling each space between the protrusions or slots, and preferably may be a plurality of tips, each inserted into the space between the protrusions or slots.

Regardless of what type of plug member embodiment is used, the tip may be adapted to fill the all of the spaces formed between the protrusions or slots, and in one embodiment, a longitudinal section of the tip may have a substantially rectangular shape. In other embodiments, the tip may be adapted to partially fill the space formed between the protrusions or slots. In these embodiments, a longitudinal section of the tip may have a substantially triangular shape. The tips preferably have a hollow portion or recessed groove extended from an upper surface or a lower surface thereof.

The isolating means may further include an auxiliary plug member that may fill the space between the permanent magnets.

The auxiliary plug member may be a unitary piece that fills the spaces between the permanent magnets, or it may be a plurality of individual pieces that close each space between the permanent magnets individually.

According to the present invention, the clearance space between the stator and the rotor isolates that stator and the rotor, preventing them from contacting one another.

Resultantly, the present invention prevents explosive sound due to the air collision and the resonance sound generated during the operation of the motor, thereby improving the confidence of consumers on the product.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 10b is a rear perspective view of the plug member of FIG. 10a.

FIG. 11b is a cross-sectional view taken along line II—II in FIG. 11a.

FIG. 13b is a rear perspective view of the plug member of FIG. 13a.

FIG. 14b is a cross-sectional view taken along line III–III in FIG. 14a.

DETAILED DESCRIPTION OF THE ILLUSTRATED EMBODIMENTS

Figure 1:
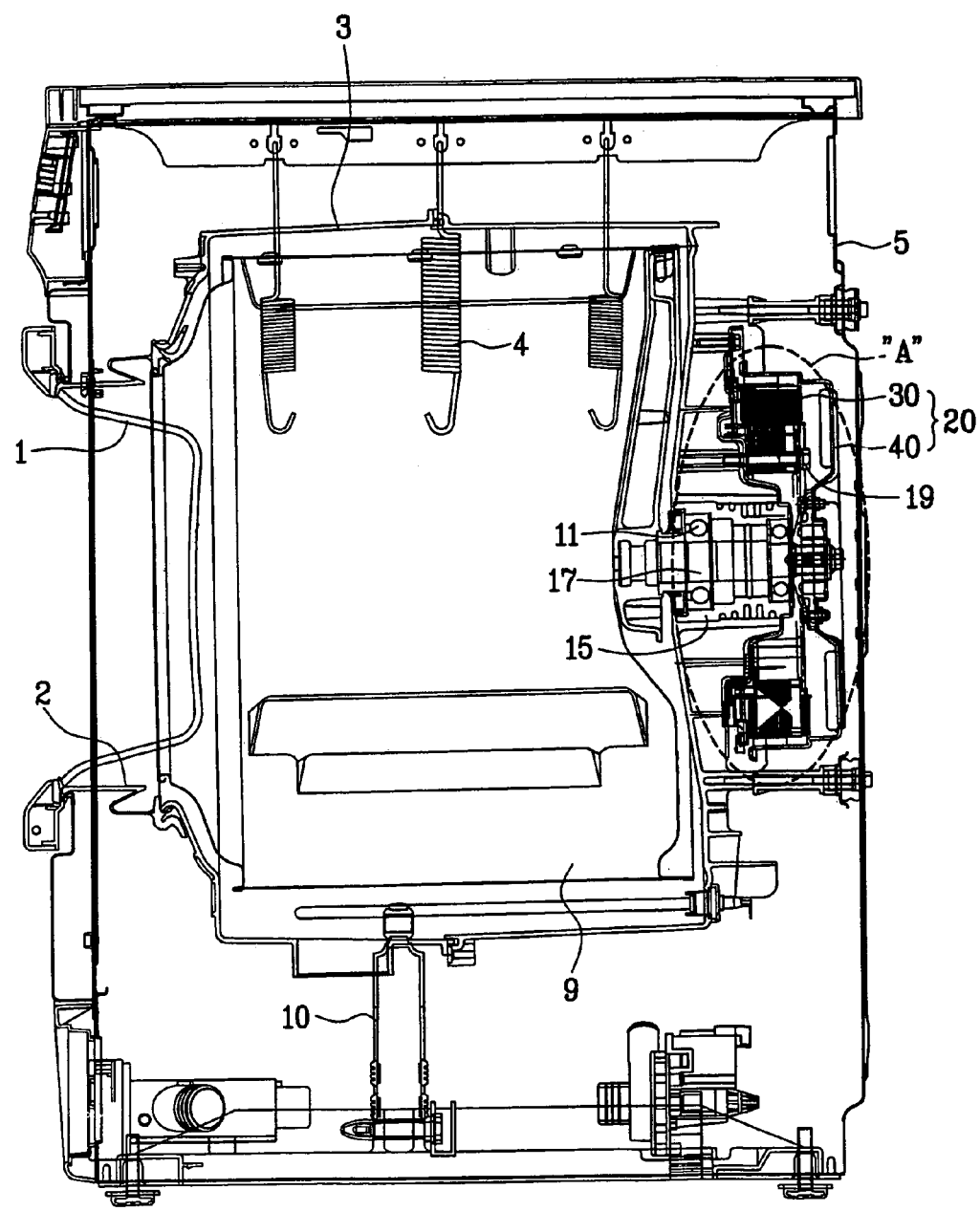
FIG. 1 is a cross sectional view for illustrating the structure of a conventional drum-type washing machine.
Figure 2:
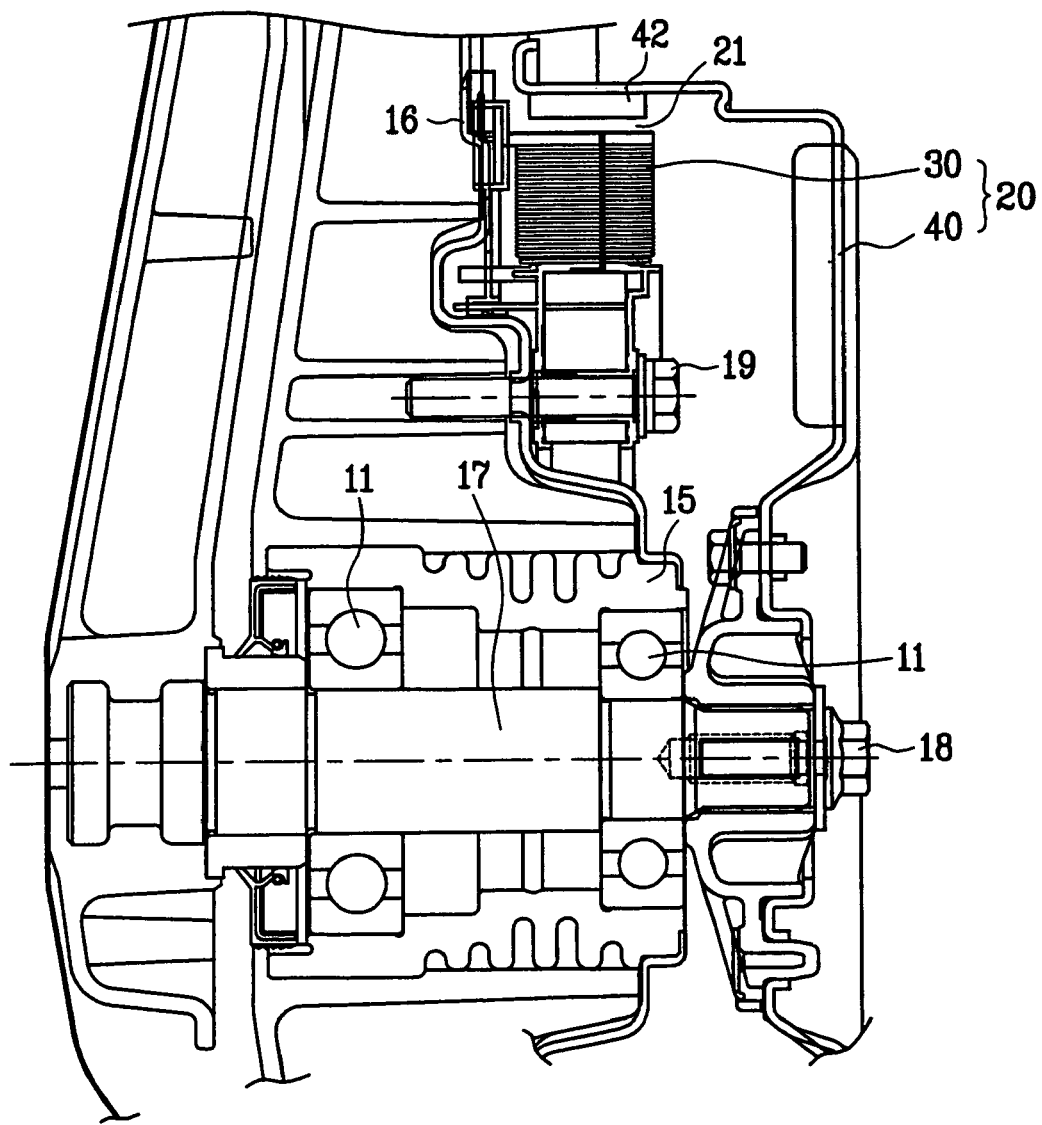
FIG. 2 is an enlarged view of cut-out 'A' in FIG. 1.
Figure 3:
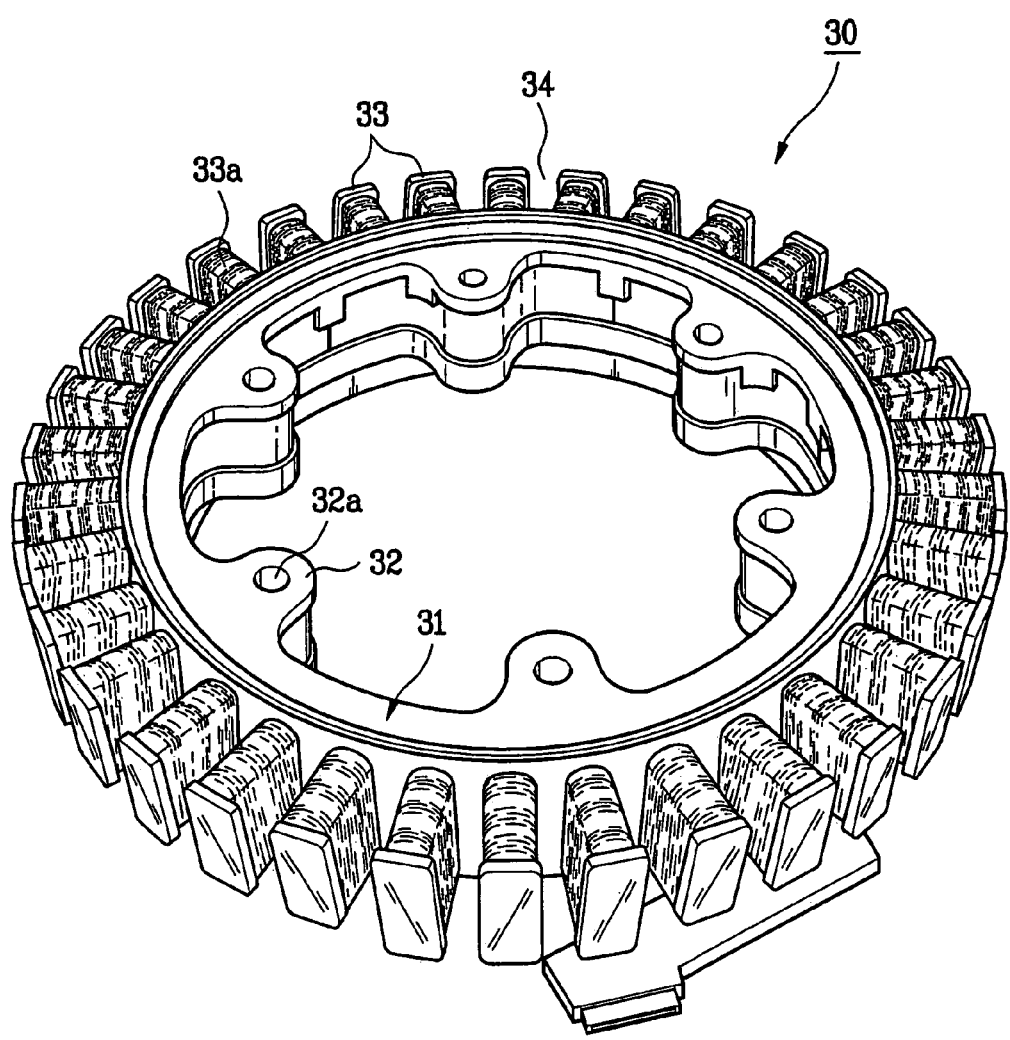
FIG. 3 is a perspective view of a stator in FIGS. 1 and 2.
Figure 4:
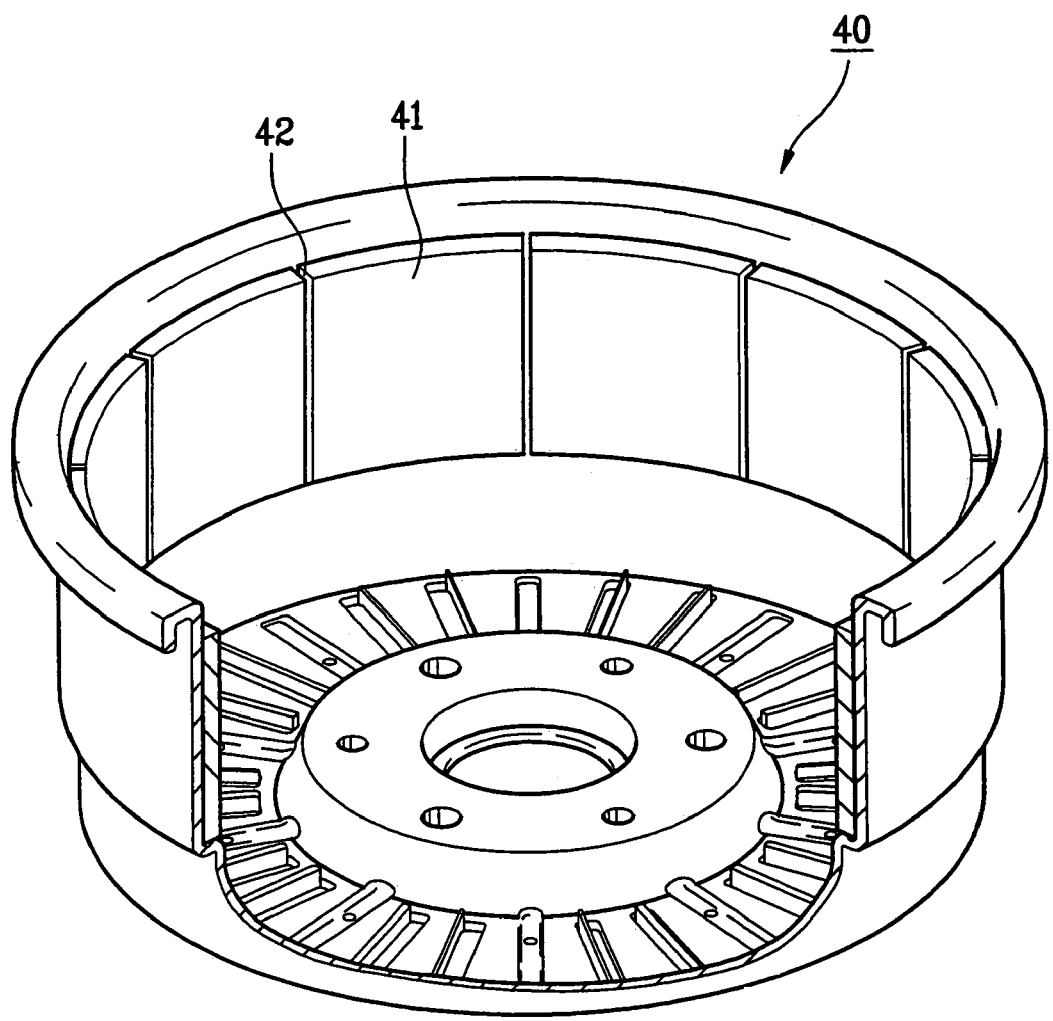
FIG. 4 is a perspective view of a rotator in FIGS. 1 and 2.

Reference will now be made in detail to the various embodiments of the present invention, examples of which are illustrated in the accompanying drawings. In the embodiments, like parts are shown by corresponding reference numerals throughout the drawings, and additive explanation thereof will be omitted.

Figure 5:
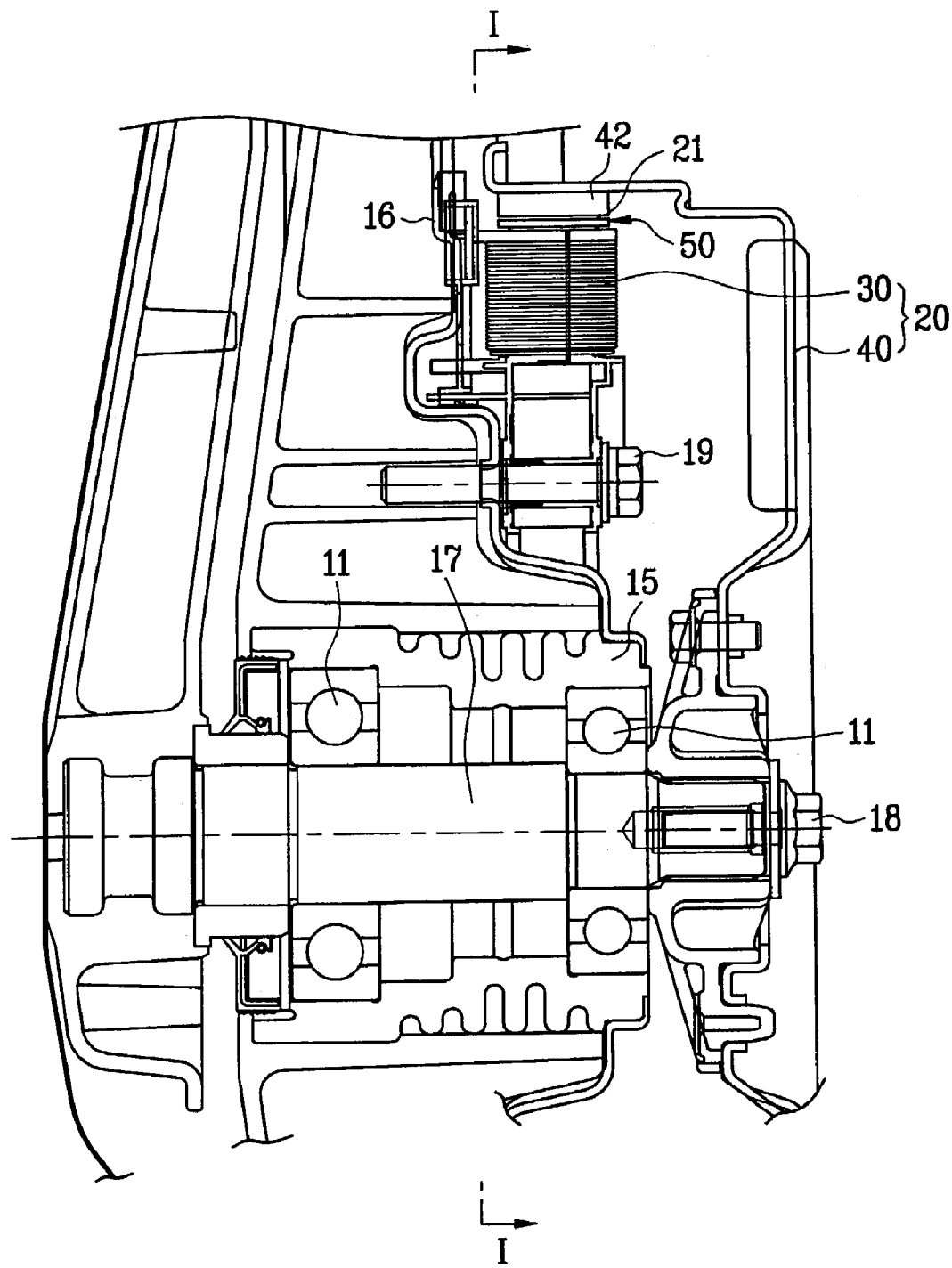
FIG. 5 is a partial cross-sectional view of a motor according to one embodiment of the present invention.
Figure 6:
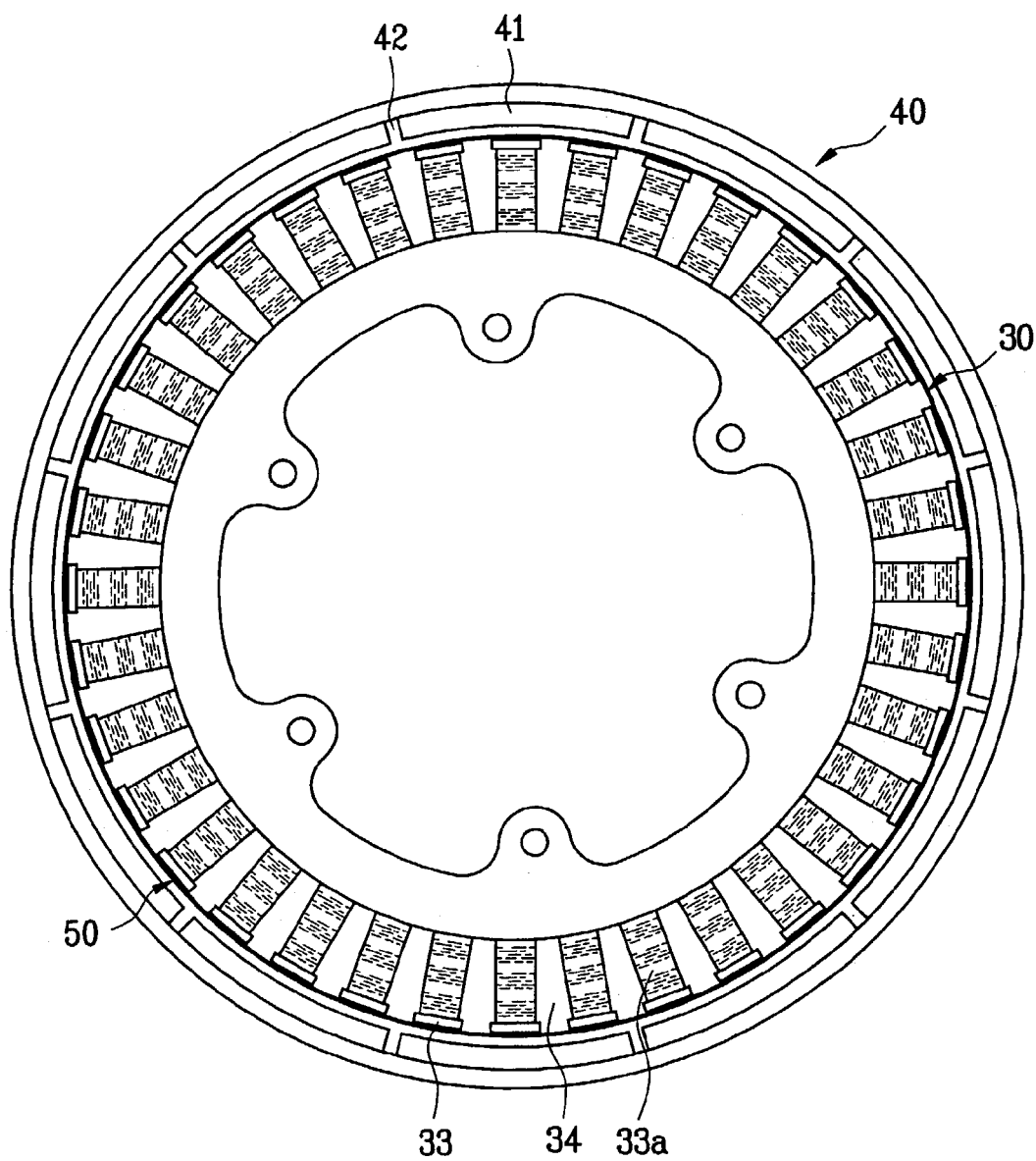
FIG. 6 is a cross-sectional view taken along line I—I in FIG. 5.
Figure 7:
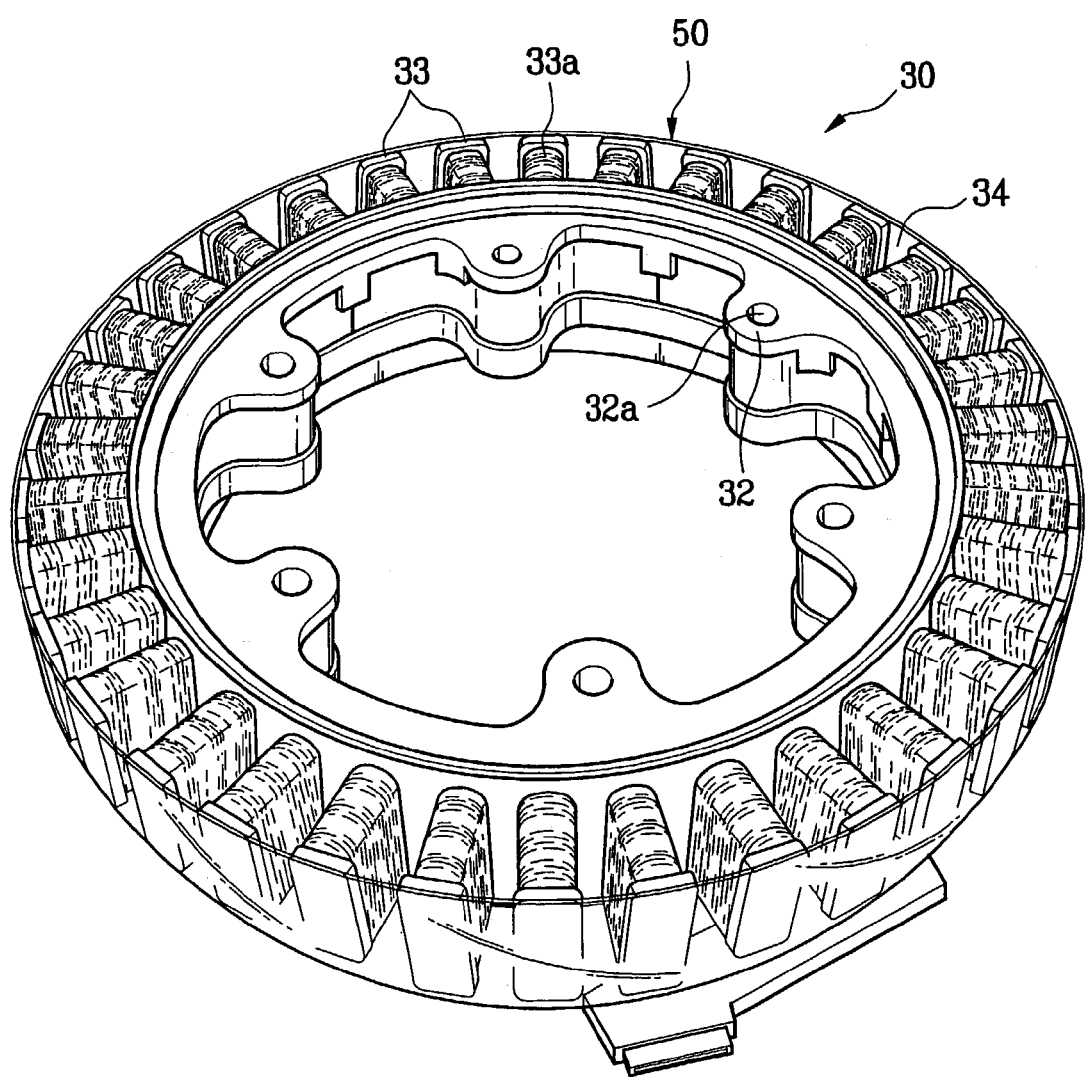
FIG. 7 is a perspective view of a shield plate and a stator installed in a motor according to one embodiment of the present invention.
Figure 8:
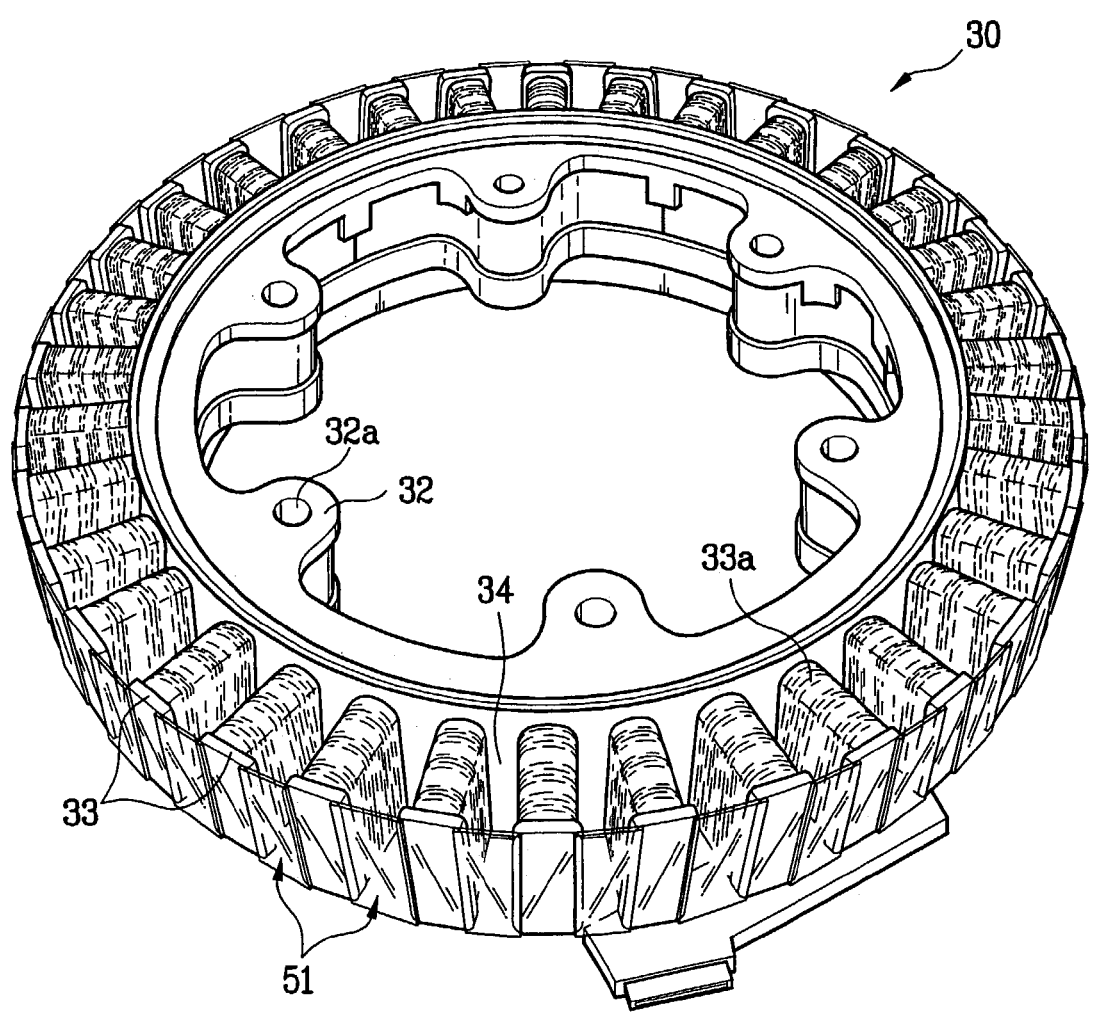
FIG. 8 is a perspective view of a shield plate and a stator installed in a motor according to an alternative embodiment of the present invention.

One embodiment of the present invention will now be described in detail with reference to FIGS. 5 to 9. FIG. 5 is a partial cross-sectional view of a motor according to one embodiment of the present invention, and FIG. 6 is a cross-sectional view taken along line I—I in FIG. 5. FIG. 7 is a perspective view of a shield plate and a stator installed in the motor according to an embodiment of the present invention, and FIG. 8 is a perspective view of the shield plate and the stator installed in the motor according to an alternative embodiment of the present invention.

Referring to FIG. 5, a motor 20 for use in a washing machine may include a stator 30 fixed to a rear surface of a tub 3, and a rotor 40 provided outside the stator at a predetermined clearance 21. Motor 20 preferably includes an isolating member for isolating the clearance space 21 between the stator 30 and the rotor 40.

The stator 30 may have a plurality of protrusions or slots 33, which are radially disposed about frame 31, and about which coils 33a may be wound. The rotor 40 preferably has a plurality of permanent magnets 41 that enclose protrusions or slots 33, and is also directly coupled to a washing drum 9 installed inside the tube 3 by means of a driving shaft 17. Accordingly, the clearance space 21 is located between protrusions or slots 33 and permanent magnets 41. The isolating member may also partition clearance space 21 to prevent fluid communication between the air in clearance space 21 and the air in stator 30 and rotor 40 and to prevent contact between stator 30 and rotor 40. The stator 30 and rotor 40 used in conjunction with motor 20 of the present invention are substantially similar in structure to those of conventional motors, which are known in the art. The isolating member will now be described in detail.

The isolating member preferably includes shield plates 50 and 51 for shielding the space 34 between the protrusions or slots 33 of the stator 30.

As shown in FIGS. 6 and 7, shield plate 50 may be a unitary piece that fully encloses all of the outer surfaces of the protrusions or slots 33 that face the permanent magnets 41. Specifically, the shield plate 50 is continuously formed about the circumference of the outer edges of protrusions or slots 33, such that shield plate 50 has substantially a ring shape to shield each space 34 between each protrusion or slot 33 as an entire unit.

FIG. 8 depicts an alternative embodiment to unitary shield plate 50. In this embodiment, shield plate 51 of the stator 30 may consist of a plurality of individual pieces each attached to the surface of the adjacent protrusion or slot 33 facing the permanent magnet. Specifically, the shield plate 51 is discontinuous along the radial outer end surfaces of the adjacent protrusions or slots 33. The shield plate 51 closes or fills each space 34 between the protrusions or slots 33 individually, so that each space 34 may be closed by using less material relative to an embodiment using a unitary shield plate.

When power is applied to the motor 20, if the shield plates 50 and 51 are magnetized, the operation of the motor may be adversely affected, thus, it is preferable to manufacture the shield plate with non-magnetic material. Shield plates 50 and 51 may be made of either a non-adhesive flexible film or an adhesive tape to prevent them from becoming magnetized.

In an embodiment in which a non-adhesive flexible film is used, individual shield plates 51 may exhibit a tight fit between the radial outer end surfaces of protrusions or slots 33, whereas, in embodiments in which a unitary shield plate is used, the unitary shield must be attached by an additional adhesive. In embodiments utilizing adhesive tape, the shield plates 50 and 51 may be easily attached to the radial outer end surfaces of protrusions or slots 33.

Shield plates 50 and 51 reduce vibration of protrusions or slots 33 as well as closing spaces 34. In some embodiments in which a tight fit is desired, the film or tape may be made of a resin that shrinks when exposed to heat. In these embodiments, the adhesive used to attach shield plates 50 and 51 may be shrunk by the heat generated from the operation of the motor 20, thereby creating a firm hold of protrusions or slots 33.

Figure 9:
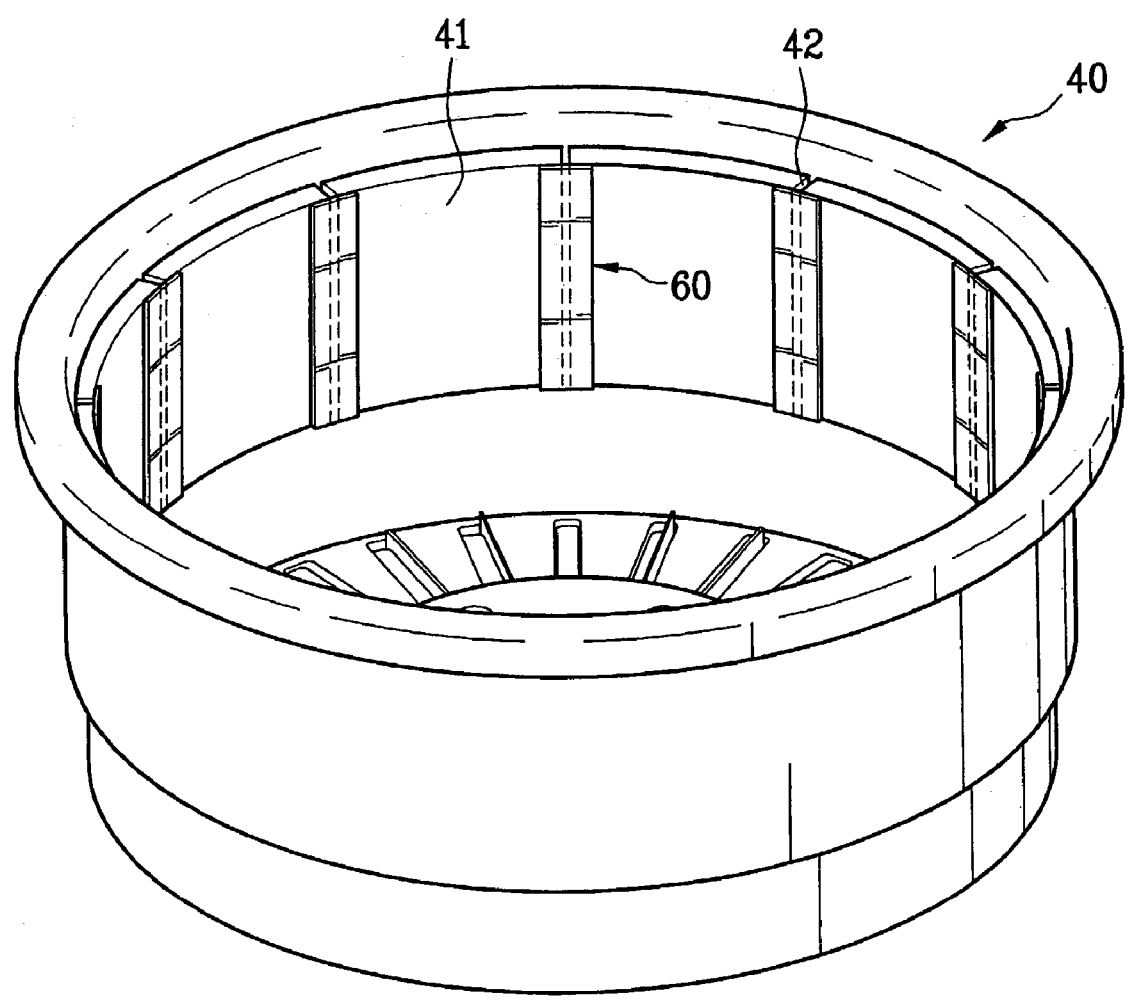
FIG. 9 is a perspective view of a shield plate and a rotor installed in a motor according to an embodiment of the present invention.

Because there is a space 42 between the permanent magnets 41 of the rotor 40, a complete shield or partition may not be provided by shields 50 and 51. Thus, the isolating member may further include an auxiliary shield plate 60 for closing spaces 42 between the permanent magnets 41, as shown in FIG. 9. Auxiliary shield plate 60 may completely isolate stator 30 from rotor 40 to create clearance space 21.

The auxiliary shield plate 60 may be a plurality of unit pieces, which may be attached to the surfaces of two adjacent permanent magnets facing the protrusions or slots 33. Auxiliary plate 60 may also close the space 42 between the permanent magnets 41, as shown in FIG. 9. Although not shown in the accompanying drawings, the auxiliary shield plate may be a ring-shaped unitary piece entirely enclosing the entire surfaces of the permanent magnet 41 facing the protrusions or slots 33, i.e., substantially enclosing the inner periphery of the permanent magnet 41, closing spaces 42 as a unit in a similar manner as unitary shield plate 50 mentioned above.

Preferably, the auxiliary shield plate 60 is made of non-magnetic material to prevent the operation of the motor 20 from being adversely affected; thus, auxiliary shield plate 60 may be either a non-adhesive flexible film or an adhesive tape. Specifically, the film or tape may be made of a material that shrinks when exposed to heat.

In one embodiment of the present invention, shield plates 50 and 51 and auxiliary shield plate 60 are thick enough to prevent physical contact between the rotor 40 and the stator 30 as well as fluid communication of the air between protrusions or slots 33 and the air in clearance space 21. Shield plates 50 and 51 and auxiliary shield plate 60 may be made of transparent, semi-transparent, or opaque materials.

The operation of the motor according to one embodiment of the present invention will now be described.

When the rotor 40 is rotated at a high speed, air flows rapidly through clearance space 21 between the stator 30 and the rotor 40. Air in the spaces 34 between protrusions or slots 33 remains stationary, creating a pressure differential.

In the present invention, when motor 20 is operational, shield plates 50 and 51 close the spaces 34 between protrusions or slots 33, thereby isolating or partitioning the clearance space 21 from the space 34. Specifically, the shield plates 50 and 51 prevent fluid communication between the space 34 and the clearance space 21. Accordingly, in spite of the pressure differential, the static air in the space 34 does not flow into the clearance space 21, and thus does not collide with the dynamic air in the clearance 21. As a result, creation of unwanted noise, including resonant vibration noise in the clearance space 21 and the space 34 is prevented. In addition, the small spaces 42 between the permanent magnets 41 are closed by the auxiliary shield plate 60, completely isolating clearance space 21 from the spaces 34 and 42. Accordingly, the occurrence of noise may be remarkably reduced during the operation of the motor.

Additionally, when the motor 20 is operational, the polarity of each of the protrusions or slots 33 is changed at a high speed, causing individual protrusions or slots 33 to vibrate, which may also create noise and possibly generate resonant sound. The shield plates 50 and 51 of the present invention stabilize the protrusions or slots 33, thereby preventing noise from being generated due to the vibration of the protrusions or slots. In addition, the auxiliary plate 60 can prevent the vibration of the permanent magnet 41.

Figure 10A:
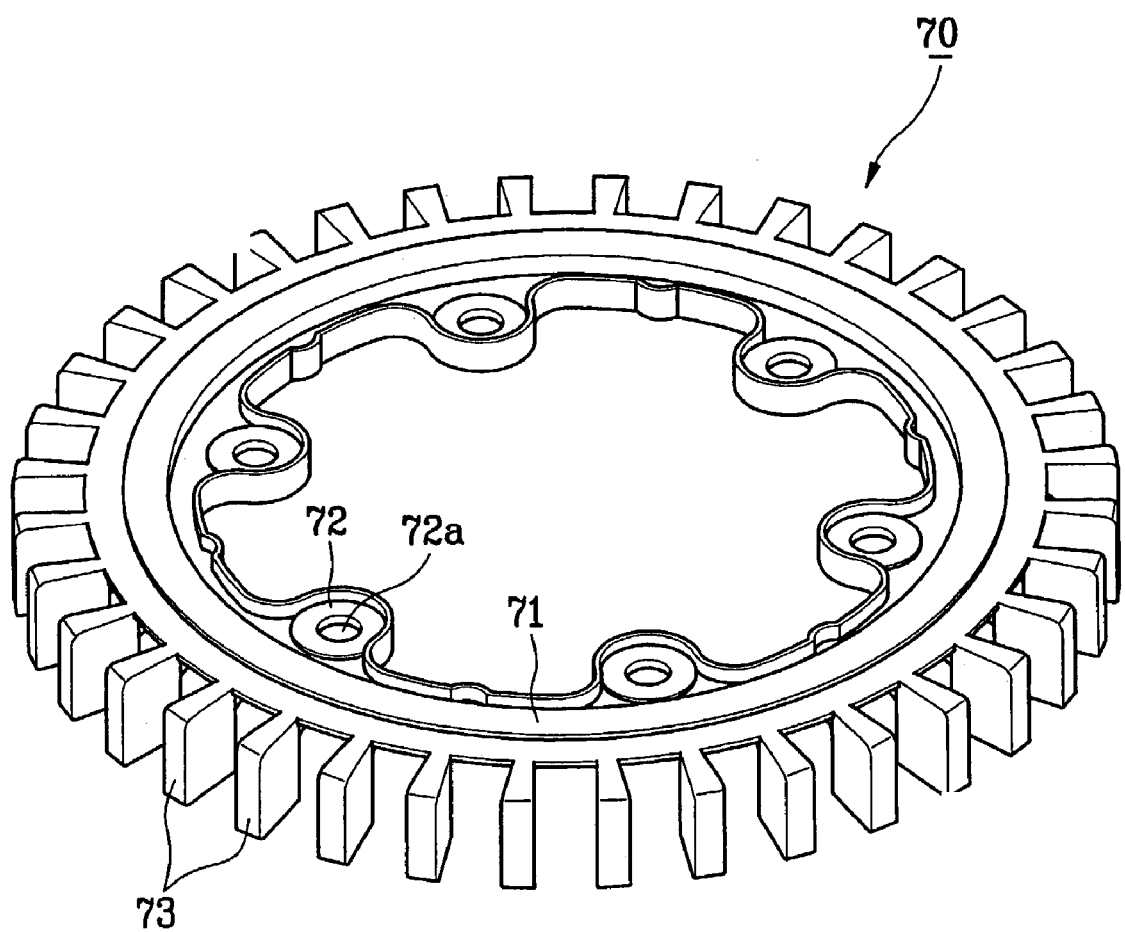
FIG. 10a is a perspective view of a plug member of a motor according to an embodiment of the present invention.
Figure 10B:
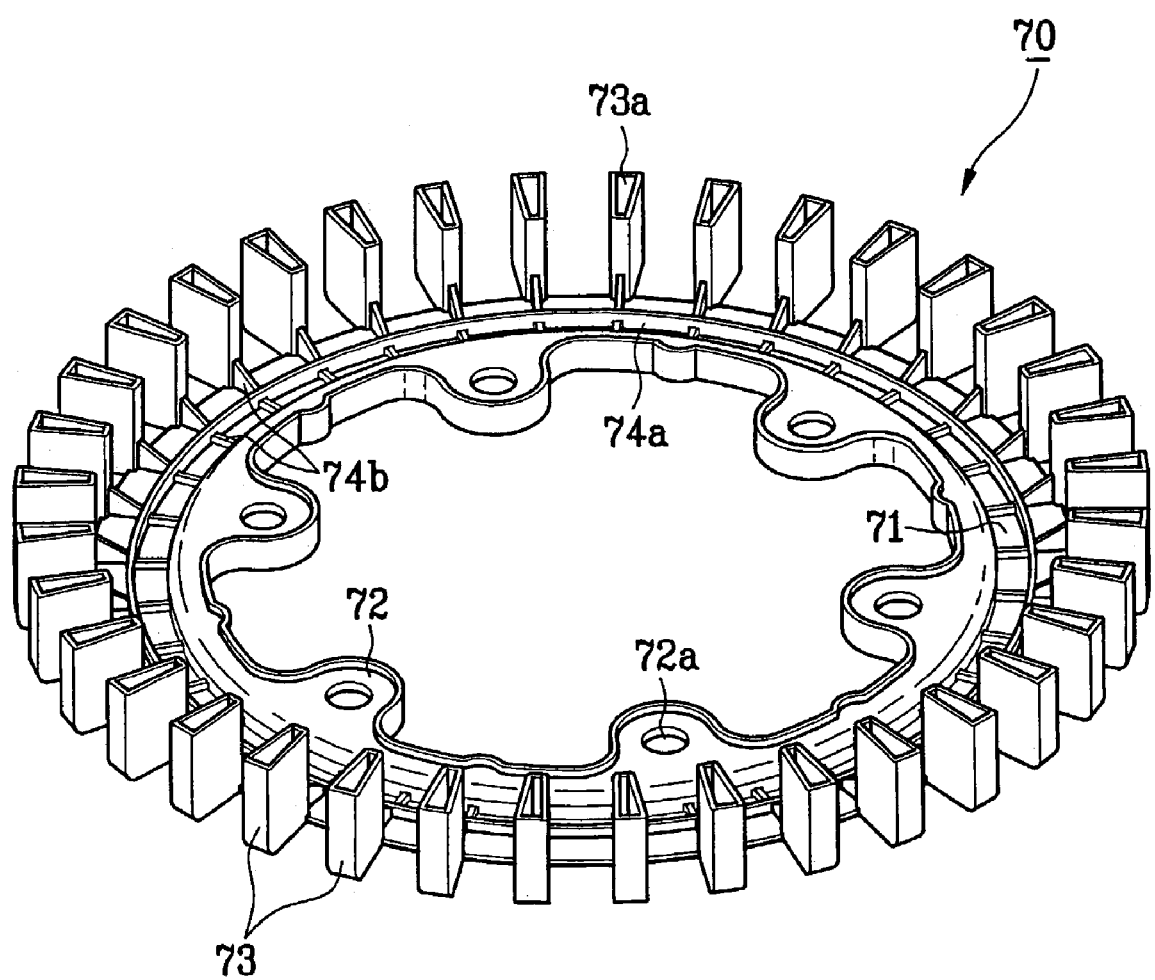
Figure 11A:
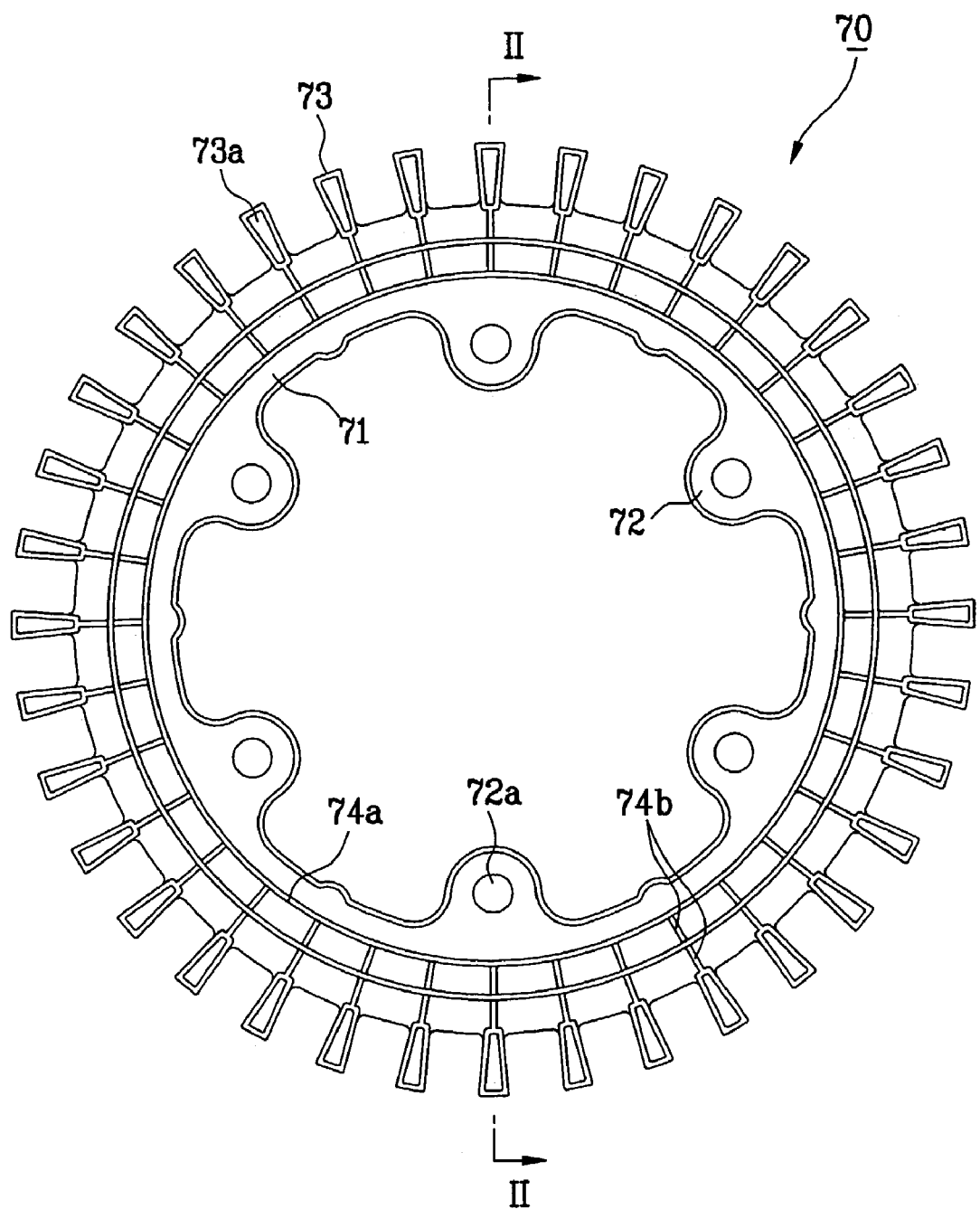
FIG. 11a is a plan view of the plug member of FIG. 10b.
Figure 11B:
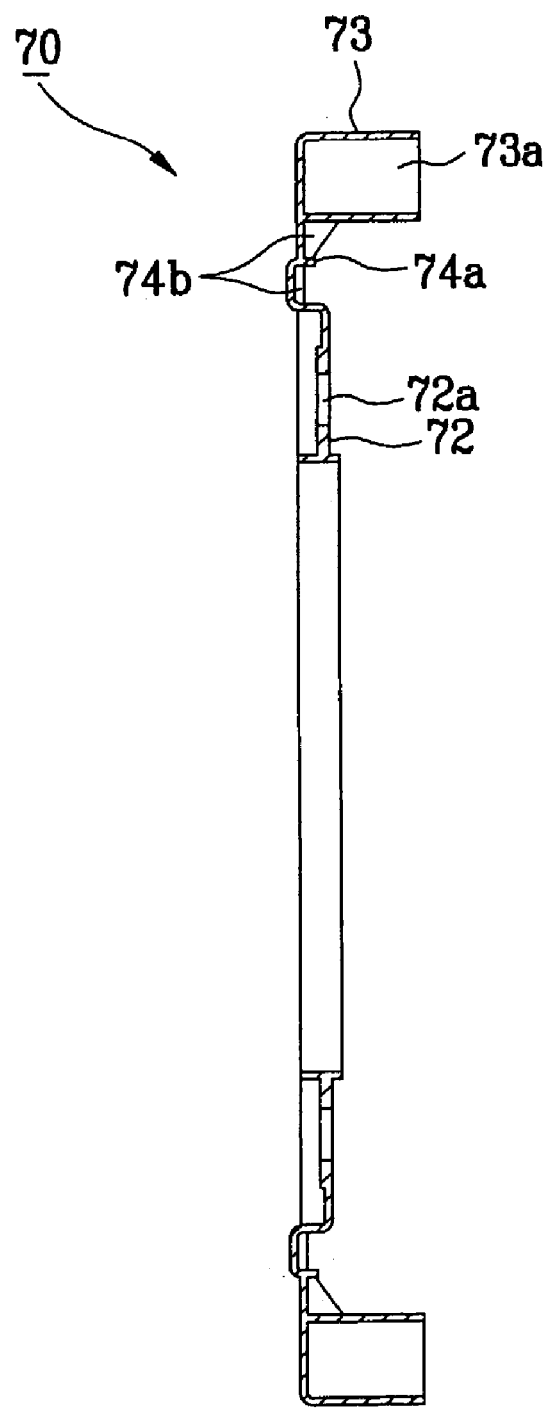
Figure 12:
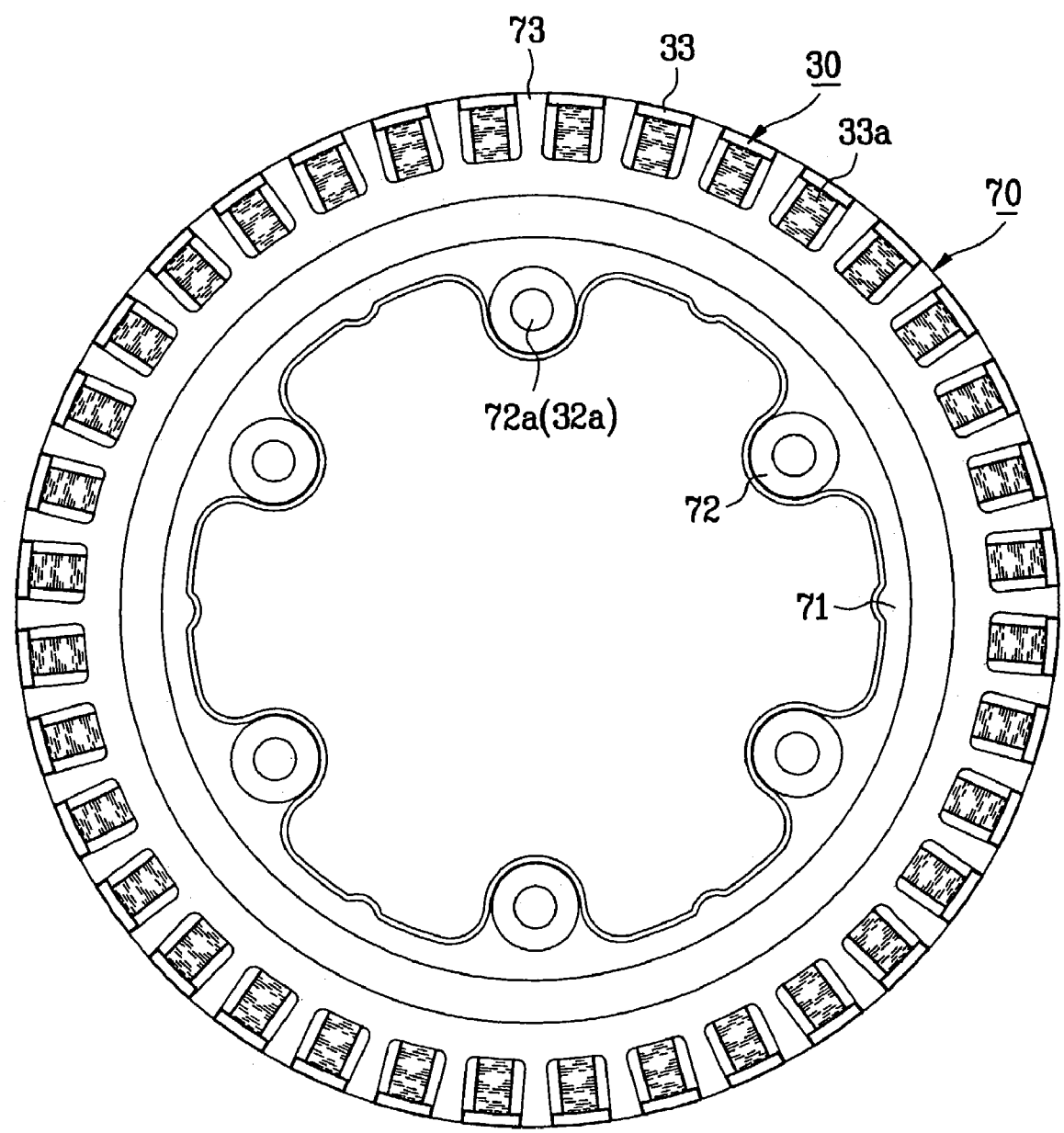
FIG. 12 is a plan view for illustrating an assembled state of a plug member and a stator according to an embodiment of the present invention.
Figure 13A:
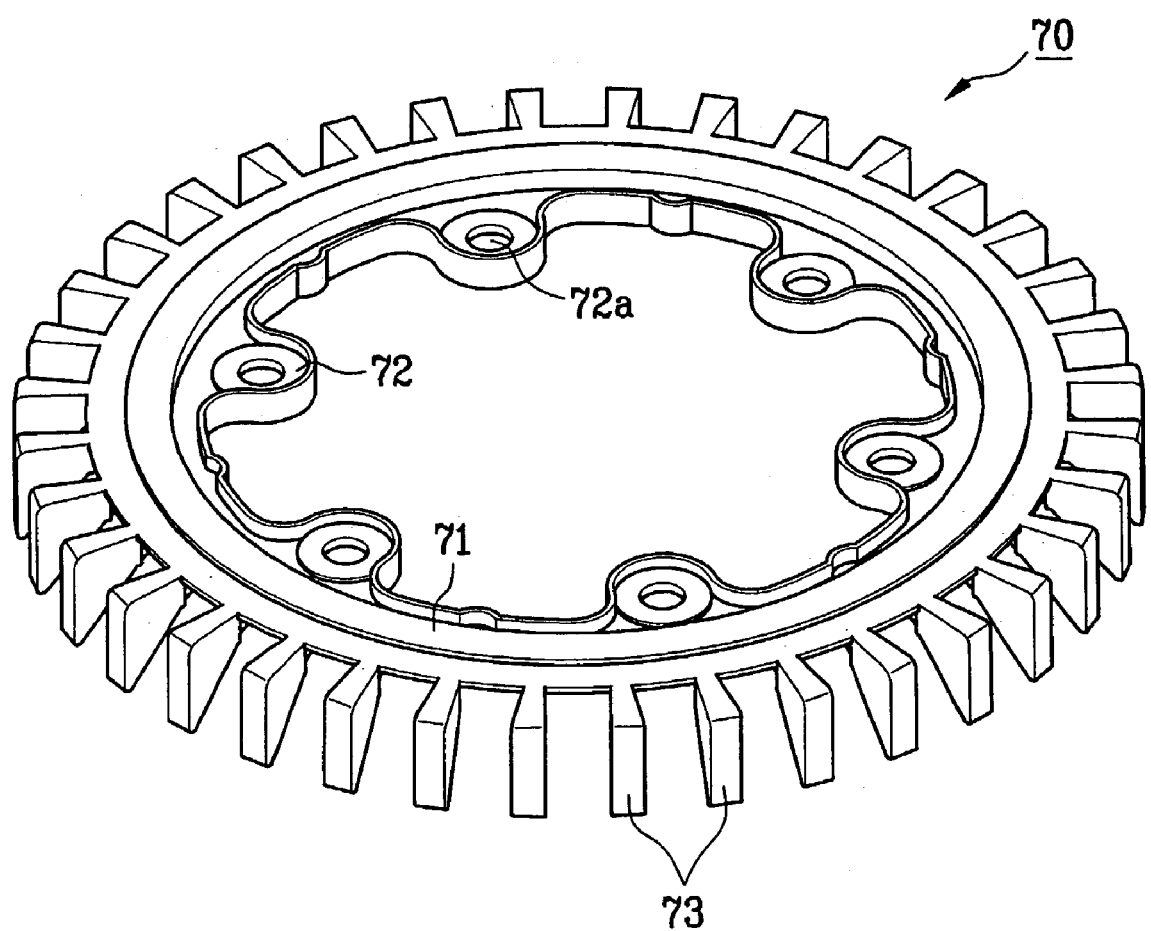
FIG. 13a is a perspective view of an alternative view of a plug member according to an embodiment of the present invention.
Figure 13B:
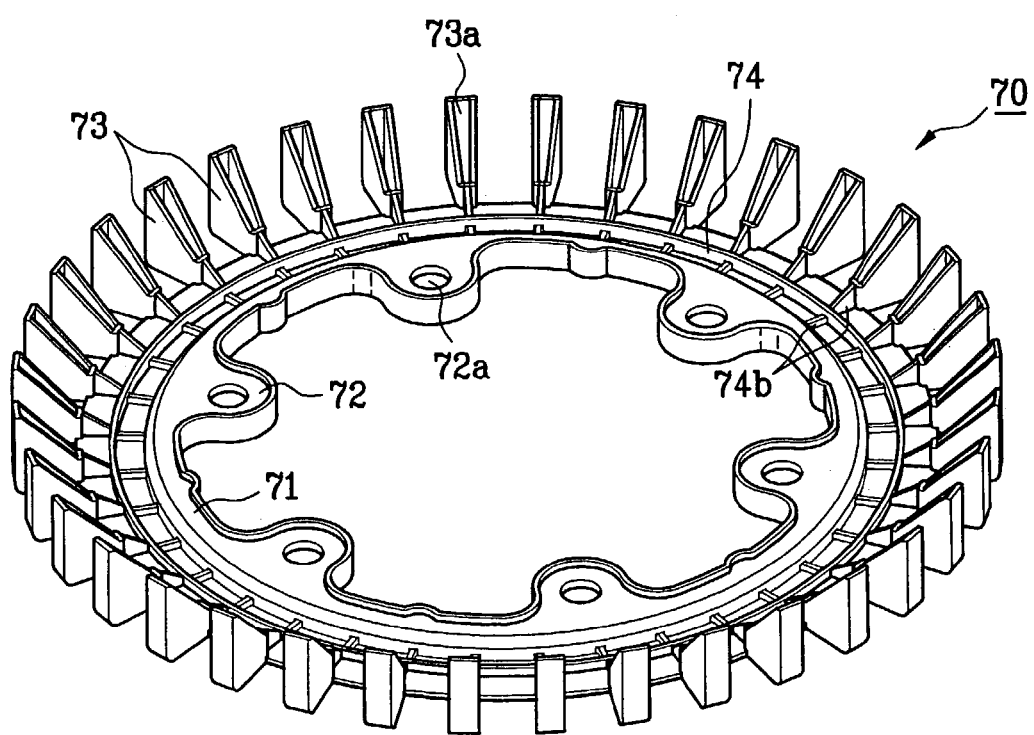
Figure 14A:
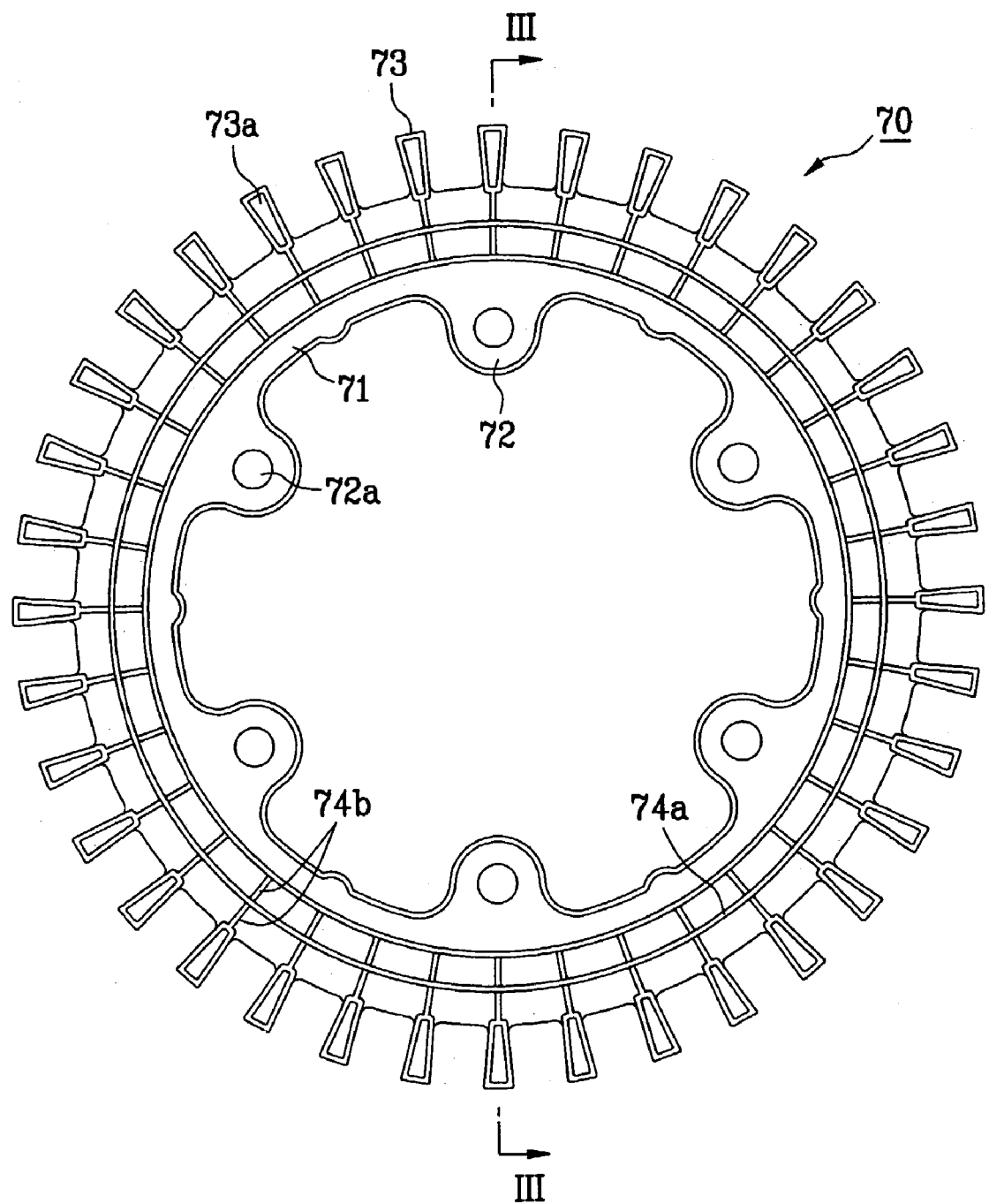
FIG. 14a is a plan view of the plug member of FIG. 13b.
Figure 14B:
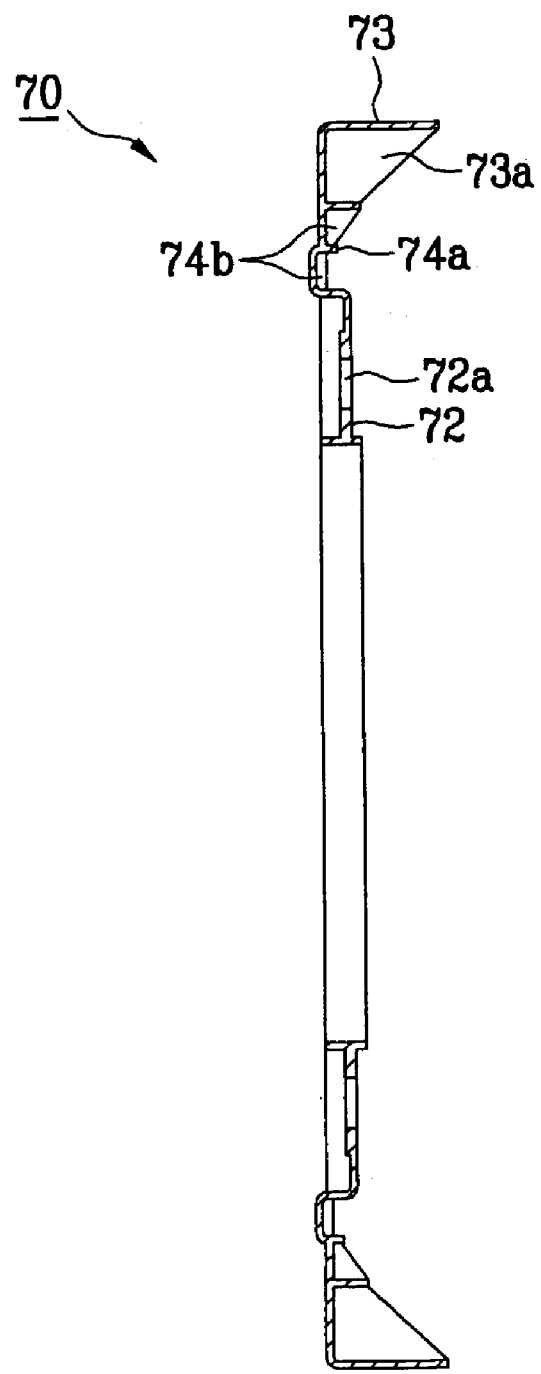

An alternative embodiment of the present invention will now be described in detail with reference to FIGS. 10a to 15. FIG. 10a is a perspective view of a plug member of a motor according to the second embodiment of the present invention, FIG. 10b is a rear perspective view of the plug member of FIG. 10a, FIG. 11a is a plan view of the plug member of FIG. 10b, and FIG. 1b is a cross-sectional view taken along line II—II in FIG. 11a. FIG. 12 is a plan view for illustrating an assembled state of the plug member and the stator according to the second embodiment of the present invention.

In an alternative embodiment of the present invention, a motor 20 for use in a washing machine may include a stator 30 fixed to a rear surface of a tub 3, a rotor 40 provided outside the stator 30 at a predetermined clearance 21, and an isolating member for isolating or partitioning the clearance space 21 from the stator 30 and the rotor 40. The stator 30 and rotor 40 are preferably substantially identical in their structures to those of the previous embodiment.

Referring to FIG. 10A, the isolating member preferably includes a plug member 70, which is adapted to fill a spaces 34 between protrusions or slots 33.

The plug member 70 may be a unitary piece filling the spaces between the respective protrusions or slots 33, as shown in accompanying drawings. Preferably, the plug member 70 is made of non-magnetic material to prevent an electrical interference with the stator 30. Specifically, as shown in FIG. 10a, the plug member 70 includes a hub 71 seated on an upper surface of a frame 31 of the stator 30, a coupling rib 72 formed at the hub 71, and a plurality of tips 73 formed about the hub at regularly spaced intervals or increments. Preferably, the plug member 70 also includes reinforcing ribs 74a and 75b to reinforce tips 73 as shown in FIG. 10b.

The hub 71 may have the same shape as frame 31. Rib 72 may protrude from the inner periphery of the hub 71 so as to correspond to the coupling rib 32 for fixing the stator 30 to the tub 3, and may include coupling hole 72a with a desired size. The reinforcing ribs 74a and 74b may be located at the rear surface of the hub 71, and may be formed circumferentially about frame 31, as shown in FIG. 11a.

The tips 73 are integrally formed along an outer periphery of the hub 71, and are inserted into each space 34 between the protrusions or slots 33. Tips 73 may be formed to fill the entire space 34 between each protrusion or slot 33. In this embodiment, the longitudinal section of the tip 73 may have a substantially rectangular shape, as shown in FIG. 11b. Additionally, in embodiments in which tip 73 isolates spaces 34 and clearance space 21 from each other, it may not be necessary to fill the entire space 34 between each protrusion or slot 33. Accordingly, if tip 73 is shaped to partially fill the space 34 between each protrusion or slot 33, the longitudinal section of the tip 73 may have a substantially triangular shape. The radial end of the tip 73 may be shaped to close the space 34 between each protrusion or slot and thus isolate or partition the space 34 from the clearance space 21.

Partial tip 73 may be manufactured with less material and still fill the space 34. Furthermore, because tip 73 may have a hollow portion or a recessed groove 73a extended from an upper or lower surface as shown in FIGS. 11a and 11b, it is possible to further reduce the amount of the material required to manufacture the plug member 70.

Additionally, because tip 73 may have a slightly elastic hollow portion or recessed groove 73a, it may provide a tight fit between protrusions or slots 33, stabilizing protrusions or slots 33 to prevent vibration of protrusions or slots 33 during the operation of the motor.

A process of assembling the plug member 70 and the stator 30 will now be described.

The plug member 70 may be fixed to the rear wall of the tub 3 with the stator 30 after the stator 30 and plug member 70 have been assembled. Specifically, after the coupling rib 32 of the stator is matched with the coupling rib 72 of the plug member 70, tip 73 is inserted between protrusions or slots 33. As a result, the coupling hole 32a of the coupling rib 32 is aligned with the coupling hole 72a of the coupling rib 72. The coupling member 19 thus protrudes through the coupling holes 32a and 72a to be coupled to the rear wall of the tub 3, to complete the assembly.

Although not shown in the accompanying drawings, the plug member may consist of a plurality of individual pieces, preferably tips, each filling each space 34 between protrusions or slots 33. Tips 73 may be manufactured in a specific formation having modules filling the spaces 34 in desired intervals or increments about the circumference of the stator 30. In this embodiment, the material needed for manufacture is reduced, and each tip has the same characteristics as the tip 73 described with reference to FIGS. 10a to 14b.

Figure 15:
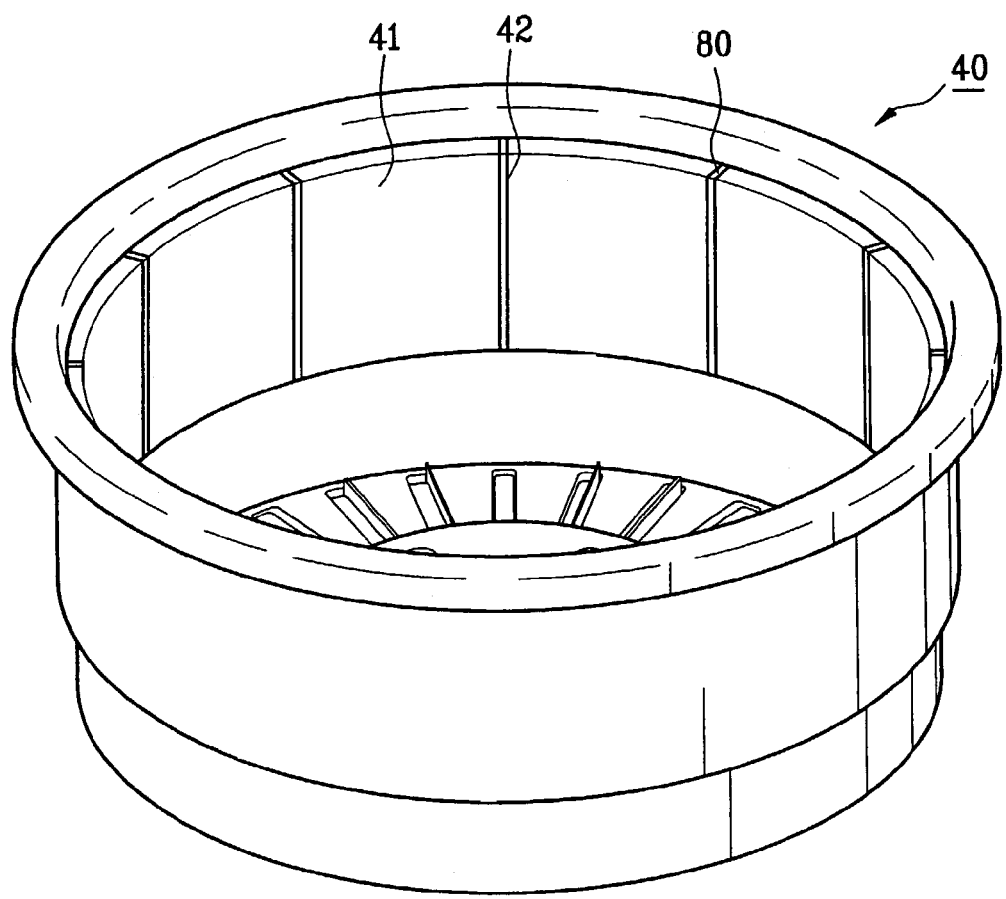
FIG. 15 is a perspective view of a plug member and a rotor installed in a motor according to an embodiment of the present invention.

In another embodiment, shown in FIG. 15, the isolating member preferably includes an auxiliary plug member 80 designed to fill the space 42 between the permanent magnets 41 so as to completely isolate or partition the clearance space 21 from the stator 30 and the rotor 40. The auxiliary plug member 80 may be a plurality of individual pieces that each close individual spaces 42, as shown in FIG. 15. Auxiliary plug member 80 may also be a unitary piece filling all of the spaces 42 between the permanent magnets 41 having a similar shape as the plug members 70. The auxiliary plug member 80 may be made of non-magnetic material.

The auxiliary plug members commonly include tips inserted into the spaces 42, and these tips preferably have the same characteristics as the aforementioned tip 73. The tips may be shaped to entirely or partially fill the space 42 between the permanent magnets 41. The tips may have a hollow portion or a recessed groove, and may be forcibly fitted between the permanent magnets 41.

The operation of the motor according to an alternative embodiment of the present invention will now be described.

When the rotor 40 is rotated at a high speed, rapid air flow is created in clearance space 21 between the stator 30 and the rotor 40 to lower the pressure. Air in the spaces 34 between protrusions or slots 33 remains stationary, creating a pressure differential with higher pressure in the spaces 34 compared with that between the clearances.

In one embodiment of the present invention, when motor 20 is operational, the plug member 70 closes or fills the spaces 34, thereby isolating or partitioning the clearance space 21 from the space 34. Specifically, the plug member 70 fills the all of spaces 34, preventing a pressure differential and, thus, fluid communication between spaces 34 and clearance space 21. Accordingly, the noise generated due to rapid air flowing through clearance space 21 is prevented. In embodiments in which space 34 is partially filled with the plug member 70, the tip 73 is shaped to close the space 34, so that a pressure differential cannot be created between space 34 and the clearance space 21. Accordingly, fluid communication between space 34 and clearance space 21 is prevented, and thus noise due to air collision is also prevented. The auxiliary plug member 80 also fills or closes the space 42 between the permanent magnets 41 to further reduce the noise generated during the operation of the motor 20.

Additionally, the plug member 70 and the auxiliary plug member 80 are fitted tightly between the protrusions or slots 33 and the permanent magnet 41, thereby preventing vibration between the protrusions or slots 33 and the permanent magnet 41, thus preventing noise, especially noise caused by resonance.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A motor for use in a washing machine comprising:
   a stator fixed to a rear surface of a tub, and having a plurality of protrusions wound with a coil;

a rotor provided outside of the stator directly coupled to a washing drum installed inside the tub by a driving shaft;

permanent magnets outside of the stator attached to the rotor, a first shield plate for partitioning a clearance space from the stator and the rotor; and a second shield plate which contacts at least two of the permanent magnets for partitioning the clearance space and a space formed by the at least two permanent magnets.

2. A motor for use in a washing machine comprising:

a stator fixed to a rear surface of a tub, and having a plurality of protrusions wound with a coil;

a rotor provided outside of the stator and directly coupled to a washing drum installed inside the tub by a driving shaft;

permanent magnets outside of the stator attached to the rotor, and an isolating member for partitioning a clearance space from the stator and the rotor such that there is no fluid communication between the stator and the rotor wherein the isolating member contacts at least two of the permanent magnets for partitioning the clearance space and a space formed by the at least two permanent magnets and a shield plate for shielding a space formed between the protrusions.

3. The motor as claimed in claim 2, wherein the shield plate is a unitary piece enclosing all surfaces of the protrusions facing the one or more permanent magnets to entirely close the spaces between the protrusions.

4. The motor as claimed in claim 2, wherein the shield plate is a plurality of individual pieces each attached to surfaces of the adjacent protrusions facing the one or more permanent magnets to individually close the spaces between the protrusions.

5. The motor as claimed in claim 2, wherein the shield plate is made of non-magnetic material.

6. The motor as claimed in claim 5, wherein the shield plate is made of a non-adhesive film.

7. The motor as claimed in claim 6, wherein the non-adhesive film is made of heat-shrink resin material.

8. The motor as claimed in claim 5, wherein the shield plate is made of an adhesive film.

9. The motor as claimed in claim 8, wherein the adhesive film is made of heat-shrink resin material.

10. The motor as claimed in claim 2, wherein the isolating member includes an auxiliary shield plate for closing the space between the one or more permanent magnets.

11. The motor as claimed in claim 10, wherein the auxiliary shield plate is a unitary piece substantially entirely enclosing surfaces of the one or more permanent magnets facing the protrusions to substantially entirely close the space between the one or more permanent magnets.

12. The motor as claimed in claim 10, wherein the auxiliary shield plate is a plurality of individual pieces each attached to a surface of the adjacent one or more permanent magnets facing the protrusions to individually close the spaces between the one or more permanent magnets.

13. The motor as claimed in claim 10, wherein the auxiliary shield plate is made of non-magnetic material.

14. The motor as claimed in claim 10, wherein the auxiliary shield plate is made of a non-adhesive film.

15. The motor as claimed in claim 14, wherein the non-adhesive film is made of heat-shrink resin material.

16. The motor as claimed in claim 10, wherein the auxiliary shield plate is made of an adhesive film.

17. The motor as claimed in claim 16, wherein the adhesive film is made of heat-shrink resin material.

18. The motor as claimed in claim 2, wherein the isolating member further comprises an auxiliary plug member adapted to fill the space between the one or more permanent magnets.

19. The motor as claimed in claim 18, wherein the plug member is made of non-magnetic material.

20. The motor as claimed in claim 18, wherein the auxiliary plug member is selected from the group consisting of a unitary piece filling the space between the one or more permanent magnets and a plurality of individual pieces adapted to individually close the space between the one or more permanent magnets.

21. The motor as claimed in claim 20, wherein the auxiliary plug member includes a plurality of tips each inserted into the space between the one or more permanent magnets.

22. The motor as claimed in claim 21, wherein at least one of the plurality of tips has a hollow portion or recessed groove extended from an upper surface or a lower surface thereof.

23. The motor as claimed in claim 21, wherein at least one of the plurality of tips is adapted to be forcibly fitted between the one or more permanent magnets.

24. The motor as claimed in claim 21, wherein the plurality of tips is adapted to fill the entire spaces formed between the one or more permanent magnets.

25. The motor as claimed in claim 24, wherein a longitudinal section of at least one of the plurality of tips has a substantially rectangular shape.

26. The motor as claimed in claim 25, wherein the plurality of tips is adapted to partially fill the space formed between the one or more permanent magnets.

27. The motor as claimed in claim 26, wherein at least one of the plurality of tips has an end adapted to close the space between the one or more permanent magnets.

28. The motor as claimed in claim 26, wherein a longitudinal section of at least one of the plurality of tips has a substantially triangular shape.

29. A motor for use in a washing machine comprising:

a stator fixed to a rear surface of a tub, and having a plurality of protrusions wound with a coil;

a rotor provided outside of the stator and directly coupled to a washing drum installed inside the tub by a driving shaft;

permanent magnets outside of the stator attached to the rotor, and an isolating member for partitioning a clearance space from the stator and the rotor such that there is no fluid communication between the stator and the rotor, wherein the isolating member includes a plug member for filling the spaces between the protrusions, wherein the plug member is separate from the stator.

30. The motor as claimed in claim 29, wherein the plug member is a unitary piece filling the spaces between the protrusions.

31. The motor as claimed in claim 29, wherein the plug member is a plurality of individual pieces, each individually filling the space between the protrusions.

32. The motor as claimed in claim 29, wherein the plug member is made of non-magnetic material.

33. The motor as claimed in claim 29, wherein the stator is fixed to the tub by a first coupling rib and the plug member includes:

a hub seated on an upper surface of the stator;

a second coupling rib formed at the hub corresponding to the first coupling rib; and a plurality of tips formed at the hub at regular intervals, each of which is inserted into the space between the protrusions.

34. The motor as claimed in claim 33, wherein the plurality of tips is adapted to fill the entire space between the protrusions.

35. The motor as claimed in claim 33, wherein a longitudinal section of at least one of the plurality of tips has a substantially rectangular shape.

36. The motor as claimed in claim 33, wherein at least one of the plurality of tips is adapted to partially fill the space formed between the protrusions.

37. The motor as claimed in claim 33, wherein at least one of the plurality of tips has a hollow portion or recessed groove extended from an upper surface or a lower surface thereof.

38. The motor as claimed in claim 33, wherein the plug member further includes a plurality of reinforcing ribs formed at the hub for reinforcing strength thereof.

39. The motor as claimed in claim 38, wherein a longitudinal section of at least one of the plurality of tips has a substantially rectangular shape.

40. The motor as claimed in claim 29, wherein the plug member is a plurality of tips each inserted into the space between the protrusions.

41. The motor as claimed in claim 40, wherein the plurality of tips is adapted to fill the entire space between the protrusions.

42. The motor as claimed in claim 40, wherein at least one of the plurality of tips is adapted to partially fill the space formed between the protrusions.

43. The motor as claimed in claim 40, wherein at least one of the plurality of tips has an end adapted to close the space between the protrusions.

44. The motor as claimed in claim 40, wherein a longitudinal section of at least one of the plurality of tips has a substantially triangular shape.

45. The motor as claimed in claim 40, wherein at least one of the plurality of tips has a hollow portion or recessed groove extended from an upper surface or a lower surface thereof.

46. A motor for use in a washing machine, comprising:

a stator fixed to a rear surface of a tub and having a plurality of protrusions wound with a coil;

a rotor provided outside of the stator and directly coupled to a washing drum installed inside the tub by a driving shaft;

permanent magnets outside of the stator attached to the rotor;

a first shield plate for partitioning a clearance space from the stator and the rotor; and a second shield plate for partitioning a clearance space from the stator and the rotor such that there is no fluid communication between the stator and the rotor wherein the second shield contacts at least two of the permanent magnets and partitions a space formed by the at least two permanent magnets.

47. The motor of claim 46, wherein said first and second shield plates form a plurality of individual plates.

48. A washing machine motor comprising:

a stator fixed to a rear surface of a tub and having a plurality of protrusions wound with a coil where adjacent protrusions define a first space there between;

a rotor provided outside of the stator and directly coupled to a washing drum installed inside the tub by a driving shaft;

a clearance space formed between the stator and the rotor;

a plurality of permanent magnets attached to the rotor where adjacent permanent magnets define a second space there between;

a first shield plate for partitioning the clearance space and the first space; and a second shield plate for partitioning the clearance space and the second space.

49. The washing machine motor of claim 48, wherein the first shield plate prevents fluid communication between the clearance space and the first space.

50. The washing machine motor of claim 48, wherein the second shield plate prevents fluid communication between the clearance space and the second space.

* * * * *